United States Patent [19]

Rochat

[11] Patent Number: 4,582,407
[45] Date of Patent: Apr. 15, 1986

[54] AUTOMATIC DISTRIBUTOR FOR FLAT RIGID PIECES

[76] Inventor: Charles-Louis Rochat, Chalet Mont-d'Or, 1342 Le Pont, Switzerland

[21] Appl. No.: 616,150

[22] Filed: Jun. 1, 1984

[30] Foreign Application Priority Data

Jun. 13, 1983 [CH] Switzerland .................. 3231/83

[51] Int. Cl.$^4$ .................................... G03B 23/00
[52] U.S. Cl. ....................... 353/111; 353/DIG. 1
[58] Field of Search ............... 353/DIG. 1, 111, 112, 353/113

[56] References Cited

U.S. PATENT DOCUMENTS

| | | | |
|---|---|---|---|
| 3,394,477 | 7/1968 | Johannsen | 353/112 |
| 3,656,846 | 4/1972 | Hipelius et al. | 353/112 X |
| 4,274,719 | 6/1981 | Rochat | 353/DIG. 1 |

*Primary Examiner*—Harry N. Haroian
*Attorney, Agent, or Firm*—Groff & O'Brien

[57] ABSTRACT

The automatic distributor comprises a loader (2) in which slides (3) are stacked and a separation mechanism (10) intended to isolate the lowest slide (3a) of the stack. It comprises, for this purpose, support elements consisting of claws (12) and locking elements in the form of pins (11) that work with the edge of the lower bottom slides. A motor (21) drives cams (19) intended to control the movement of the claws (12) and of the pins (11) urged by a spring (29). An optoelectronic device (36) makes it possible to detect the drop of a slide (3a) and to reverse the direction of rotation of the motor (21). Following a slide advance order, the motor (21) drives the cams (19) which allow the unit of the pins (11) to press against the edge of the lowest slides. The claws (12) are withdrawn and then gradually the pins (11) are withdrawn. As soon as the lowest slide (3a) falls, it activates the optoelectronic device (36) which reverses the direction of the motor (21). The claws (12) take their place again, the pins (11) are separated and the stack of slides presses against the claws (12). The distributor makes it possible to isolate surely and smoothly the lowest slide of a stack composed of slides (3) which may have very different thicknesses.

10 Claims, 8 Drawing Figures

AUTOMATIC DISTRIBUTOR FOR FLAT RIGID PIECES

This invention relates to an automatic distributor of flat and rigid pieces, particularly slides, comprising a loader consisting of an approximately vertical channel, in which the flat pieces are juxtaposed to form a stack, and a separation mechanism intended to separate in succession the lowest piece of the stack.

These distributors which are, for example, used in slide projectors with a vertical loader are already known. Examples of these projectors are described in U.S. Pat. No. 4,274,719 or 3,782,816. These projectors have a separation mechanism comprising an element intended to push the lowest slide of the stack by the edge to isolate it from the other slides of the stack. This mechanism comprises, however, several drawbacks. If the slides are thin, the mechanism runs the risk of moving two slides at the same time, hence the necessity for a complicated and unreliable holding device. Moreover, all the weight of the stack of slides rests on the lowest slide when it is moved. As the slides rub against each other during the separation, they run the risk of mutually scratching one another. If the slides exhibit roughnesses, coming for example from adhesive labels, or from deformations, they have a tendency to jam the separation mechanism.

The invention has as its object to eliminate these drawbacks and it is characterized, for this purpose, in that the separation mechanism comprises at least a support element of the bottom piece of the stack, on which the other pieces rest, this support element being retractable, this separation mechanism comprising also at least an element for locking the parts at the base of the channel, this locking element extending to a height corresponding at least to that of two juxtaposed parts, this locking element being controlled by a mechanism causing its gradual unlocking from the bottom of the channel upward to the top when the support element is retracted.

Although the distributor is particularly suited to the separation of slides in a projector, numerous other applications can be considered, such as, for example, use in distributors for coins, in automatic units of assembly lines, in design units for placing design elements, etc.

The accompanying drawing shows, diagramatically and by way of example, an embodiment of the automatic distributor, object of the invention.

FIGS. 4a, 4b, 4c and 4d diagrammatically show the operation of the distributor.

Figure 1:
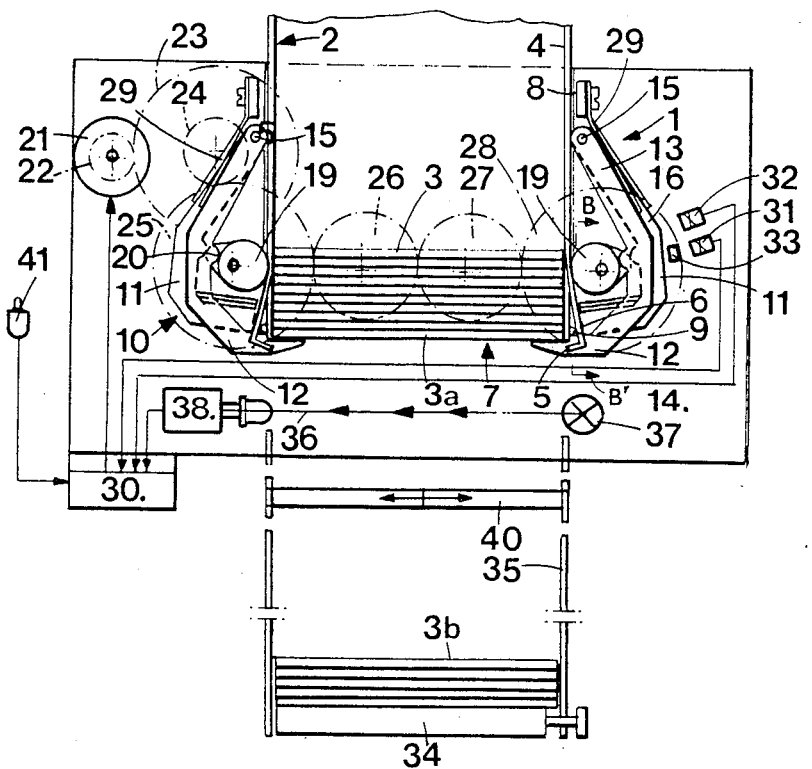
FIG. 1 is a view in lateral section of the automatic distributor.

Distributor 1, shown in FIG. 1, comprises a loader 2 consisting of a vertical channel in which slides 3 are juxtaposed forming a stack. This loader 2 consists of a transparent plastic case 4 that is 210 mm long provided with a sliding cover, not shown. At its base, it has four hooks 5 carried by flexible arms 6 solid with case 4. These hooks 5 prevent the slides from escaping through opening 7 provided at the base of case 4. The loader 2 fits vertically into a housing 8 provided in frame 14 of distributor 1. Flexible arms 6 of hooks 5 work with projecting portions 9 of housing 8 to separate hooks 5 laterally from opening 7 provided in case 4, when loader 2 is positioned in the distributor.

The distributor comprises a separation mechanism 10 intended to isolate the lowest slide 3a from the rest of the stack. The stack is then transported by a carriage 40 to the projection position. Separation mechanism 10 is provided with support elements intended to carry the stack of slides 3 when hooks 5 of box 4 are moved laterally from opening 7 and locking elements comprising two series or rows of nine pins 11 located on two opposite sides of housing 8. The support elements consist of four claws 12 placed on each side of two rows of pins 11. These claws 12 have arms 13 mounted by one of their ends on two shafts 15 solid with frame 14. The four claws 12 are able to be pivoted simultaneously from a first position in which they are engaged under the lowest slide 3a, to a second position in which they are entirely free of opening 7 (see FIG. 4b).

Figure 2:
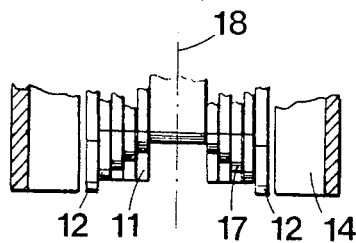
FIG. 2 shows a section along B—B' of FIG. 1.

Pins 11 also comprise arms 16 hinged on shafts 15 and, at their lower end opposite the slides, portions 17 with a high coefficient of friction, made for example of elastomer, are intended to work with the edge of the lower slides. As illustrated in FIG. 2, these portions 17 are located at increasing distances from the lower edge of pins 11 and arranged symmetrically in relation to center line 18.

Claws and pins 11 are urged by two series of blade springs 29 toward two cylindrical cams 19 with variable section intended to control the pivoting movements of claws 12 and of pins 11 around shaft 15.

Figure 3:
FIG. 3 is a view in perspective of one of the cams.

FIG. 3 shows one of the cams which is provided with a periphery subdivided into eleven sections working with projecting portions 20 of nine pins 11 and two claws 12 located at each end of housing 8. A motor 21 drives the two cams 20 by gears 22 to 28. This motor 21 is controlled by an electronic control unit 30.

The distributor further comprises two magnetic sensors 31, 32 fastened on frame 14 opposite toothed wheel 28 carrying a permanent magnet 33. The two magnetic sensors 31, 32 are connected to control unit 30 and make it possible to define, on the one hand, a starting position in which claws 12 support the stack of slides and in which pins 11 are separated from slides 3 and, on the other hand, a position in which the unit of pins and claws is separated. When the distributor is in this position, opening 7 is entirely free and an elevator mechanism makes it possible to raise, in the loader, the projected slides 3b which are stacked in a container 35 located below the distributor. A detailed description of elevator mechanism 34 is offered in U.S. Pat. No. 4,274,719.

Distributor 1 further has an optoelectronic device 36 comprising a lamp 37 and a sensor 38. The device 36 is connected to control unit 30 and supplies to this control unit a signal when a slide has been released by separation mechanism 10 and passes through the space between lamp 37 and sensor 38. Slide 3a is then gathered by carriage 40 which transports it to the projection position and brings it back after the projection to container 35, where the projected slides are deposited, as described in U.S. Pat No. 4,274,719.

With reference to FIGS. 1 and 4a-d, the automatic distributor operates in the following manner.

At the stop position, when loader 2 is in housing 8, the stack of slides rests on claws 12 while pins 11 are withdrawn by working with cams 19 (see FIG. 1). As soon as a signal for slide advance is given, for example, by control 41, motor 21 drives cams 19 which allow the set pins 11 to press against the edge of the lowest slides. The stack of slides is thus held solidly (see FIG. 4a).

Figure 4:
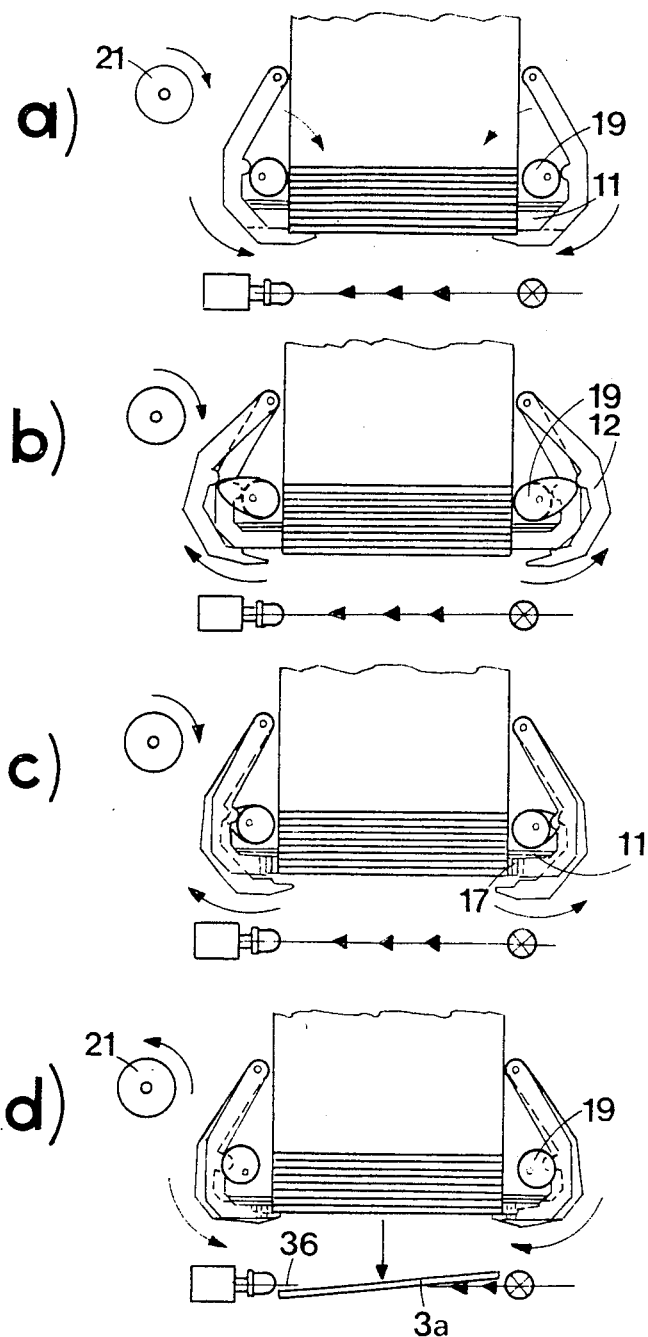

The cams continuing to rotate withdraw claws 12 (see FIG. 4b), then gradually withdraw pins 11 by beginning with the pins having their holding portion 17 nearest the bottom edge of the channel (see FIG. 4c).

As soon as the lowest slide 3a falls, it activates optoelectronic device 36, which supplies to control unit 30 a signal for reversal of the direction of motor 21. Cams 19 are then driven in reverse direction (FIG. 4d). Pins 11 again come in contact with the slides and claws 12 are placed under the stack of slides. Pins 11 are then simultaneously separated from the edge of the slides and the stack presses against claws 12. Magnet 33 on wheel 28 is then opposite magnetic sensor 31 which supplies a signal to the control unit to stop motor 21. The distributor is ready for a new cycle (see FIG. 1).

When loader 2 is empty and control 41 is activated, cams 19 separate claws 12 and all pins 11. When magnet 33 is opposite sensor 32, motor 21 is stopped and the stack of slides 3b can be raised in loader 2 by elevator mechanism 34 described in detai in U.S. Pat. No 4,274,719.

As a result of the interaction of claws 12 and pins 11 and as a result of the gradual separation of pins 11, the automatic distributor makes it possible to isolate surely and smoothly the lowest slide of a stack comprising slides of very different thicknesses, as is the case for a stack composed of a mixture of cardboard slides (thickness about 1.2 mm), plastic slides (thickness about 2 mm) and glass slides (thickness about 3 mm).

The distributor described can be easily adapted to make it possible to search for slides that are in a determined portion of the stack. Actually, it is enough to stop, in an intermediate position, the raising movement of the stack from container 35 to loader 2 and to control the locking of pins 11 to hold the upper part of the stack. The elevator is then made to go down again and it is possible to project slides contained in the upper part of the stack.

I claim:

1. An automatic distributor for slides used in slide projectors comprising a loader including a substantially vertical channel in which said slides are juxtaposed to form a stack, separation means adapted to separate in succession the lowest slide of the stack from the other slides, said separation means comprising support means for the lowest slide of the stack on which the other slides rest, means for retracting said support means, said separation means also comprising means for locking the slides at the base of said channel, said locking means extending to a height corresponding at least to that of two juxtaposed slides and means controlling said locking means to cause gradual unlocking thereof from the bottom of said channel upward when said support means is retracted.

2. An automatic distributor according to claim 1 comprising a sensor sensitive to the separation of the lowest slide of the stack, said sensor controlling the return of the support means to its unretracted position and then causing a complete unlocking of said locking means followed by a new locking thereof.

3. An automatic distributor according to claim 1 wherein, said support means comprises at least two retractable holding claws, said claws movable into said channel in two opposite positions relative thereto.

4. An automatic distributor according to claim 1 wherein, said locking means comprises a plurality of pins including portions that press resiliently against the edges of said slides, said portions offset in the direction of the height of said channel, means controlling said pins to separate them from the slides contained in said channel.

5. An automatic distributor according to claim 4 wherein, said pins are arranged in rows located on opposite sides of said channel and wherein said portions offset in the direction of the height are arranged symmetrically in relation to the center line of said rows.

6. An automatic distributor according to claim 5, wherein said holding claws are located at the lateral ends of the rows of pins.

7. An automatic distributor according to claim 1, including at least one cam, a motor driving said cam to control said retractable support means and said locking elements.

8. An automatic distributor according to claim 7, wherein said separation means comprises, a spring associated with each pin and with each claw, said spring urging said pin and claw in the direction of said slides, said cam working with a portion of said pins and claws to separate them from said slides against the action of said springs.

9. An automatic distributor according to claim 8 wherein, said cam is shaped so as to move the pins to engage with the edge of said slides before said claws are separated from said slides and so as to gradually separate the pins beginning with the pins comprising the holding portions closest to the bottom edge of the channel.

10. An automatic distributor according to claim 9 comprising a control unit controlling said motor, said sensor connected to said control unit to transmit, during the separation of a slide, a signal for reversal of the direction of rotation of said motor to control the repositioning of said claws and the unlocking of said pins.

* * * * *